(12) United States Patent
Liu

(10) Patent No.: US 10,970,509 B1
(45) Date of Patent: Apr. 6, 2021

(54) FINGERPRINT RECOGNITION APPARATUS

(71) Applicant: Novatek Microelectronics Corp., Hsinchu (TW)

(72) Inventor: Ping Liu, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/740,497

(22) Filed: Jan. 13, 2020

(51) Int. Cl.
 *G06K 9/00* (2006.01)
(52) U.S. Cl.
 CPC ..... *G06K 9/00013* (2013.01); *G06K 9/00087* (2013.01)
(58) Field of Classification Search
 None
 See application file for complete search history.

(56) References Cited

U.S. PATENT DOCUMENTS

| 2005/0152606 | A1* | 7/2005 | Wood | H04N 19/15 |
| | | | | 382/232 |
| 2017/0372121 | A1* | 12/2017 | Zhang | G06K 9/00067 |
| 2019/0318073 | A1* | 10/2019 | Lee | G06F 21/45 |
| 2020/0257873 | A1* | 8/2020 | Heo | H01L 27/1214 |

\* cited by examiner

*Primary Examiner* — Nicholas J Lee
(74) *Attorney, Agent, or Firm* — JCIPRNET

(57) ABSTRACT

A fingerprint recognition apparatus with fingerprint data compression is introduced, including: a pixel array obtaining a fingerprint data; a control circuit coupling to the pixel array and obtaining characteristic values of the pixel array; an effective fingerprint distribution judgement circuit coupling to the pixel array and determining a first part of the pixel array as an effective fingerprint zone and a second part of the pixel array as an invalid fingerprint zone according to the characteristic values of each row of the pixel array; and a multi-compressing circuit coupling to the effective fingerprint distribution judgement circuit and compressing the fingerprint data in the effective fingerprint zone with a first compression method and compressing the fingerprint data in the invalid fingerprint zone with a second compression method.

12 Claims, 3 Drawing Sheets

FINGERPRINT RECOGNITION APPARATUS

BACKGROUND

Technical Field

The invention relates to a fingerprint recognition apparatus

Description of Related Art

As demand for high recognition rate of the fingerprint has grown recently, a need for high resolution fingerprint in the fingerprint recognition apparatus is increasing, therefore, the fingerprint data process for recognizing the fingerprint increases due to the need for high resolution fingerprint, and the fingerprint data process time becomes longer when bandwidth of the fingerprint data process interface goes low. In order to shorten the fingerprint data process time for recognizing the fingerprint with high recognition rate, a data compression technique for the fingerprint data is needed.

Nothing herein should be construed as an admission of knowledge in the prior art of any portion of the present disclosure.

SUMMARY

A fingerprint recognition apparatus with an effective fingerprint distribution judgement circuit determining an effective fingerprint zone of a pixel array and an invalid fingerprint zone of the pixel array and with a multi-compressing circuit compressing the fingerprint data in the effective fingerprint zone with a first compression method and compressing the fingerprint data in the invalid fingerprint zone with a second compression method is introduced.

In an embodiment of the disclosure, the fingerprint recognition apparatus includes a pixel array obtaining a fingerprint data; a control circuit coupling to the pixel array and obtaining characteristic values of the pixel array; an effective fingerprint distribution judgement circuit coupling to the pixel array and determining a first part of the pixel array as an effective fingerprint zone and a second part of the pixel array as an invalid fingerprint zone according to the characteristic values of each row of the pixel array; and a multi-compressing circuit coupling to the pixel array and compressing the fingerprint data in the effective fingerprint zone with a first compression method and compressing the fingerprint data in the invalid fingerprint zone with a second compression method.

To sum up, in the fingerprint recognition apparatus provided by the disclosure, the fingerprint data process time for recognizing the fingerprint with high recognition rate is shortened by compressing the fingerprint data in the effective fingerprint zone with the first compression method and compressing the fingerprint data in the invalid fingerprint zone with the second compression method.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Embodiments of the disclosure are described hereinafter with reference to the drawings.

Figure 1:
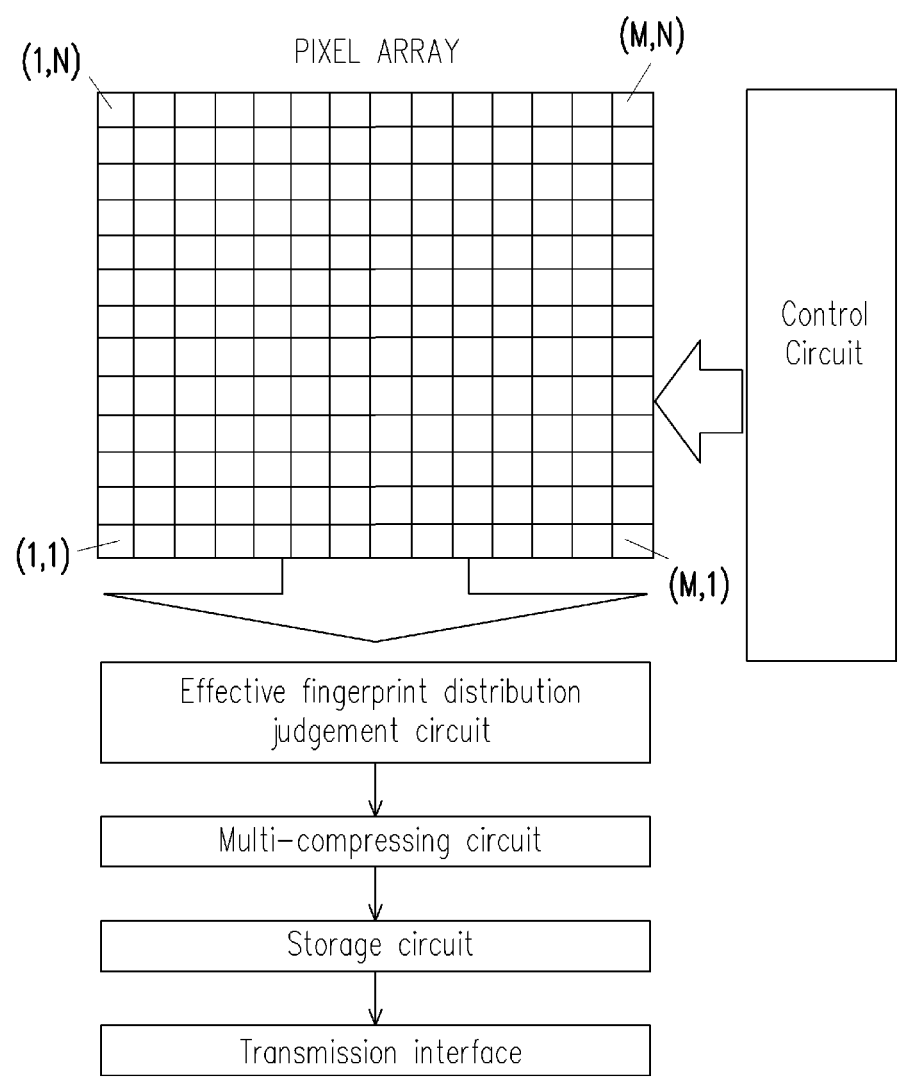
FIG. 1 is a system diagram of a fingerprint recognition apparatus according to an embodiment of the disclosure.

FIG. 1 is a system diagram of a fingerprint recognition apparatus according to an embodiment of the disclosure. The fingerprint recognition apparatus includes a pixel array with M x N dimensions, a control circuit, an effective fingerprint distribution judgement circuit, a multi-compressing circuit, a storage circuit and a transmission interface.

The pixel array obtains a fingerprint data. The control circuit coupling to the pixel array obtains the characteristic values of the pixel array by sequentially turn on the pixel array after exposure of the fingerprint data. The effective fingerprint distribution judgement circuit coupling to the pixel array determines a first part of the pixel array as an effective fingerprint zone and a second part of the pixel array as an invalid fingerprint zone according to the characteristic values of each row of the pixel array. The multi-compressing circuit coupling to the effective fingerprint distribution judgement circuit compresses the fingerprint data in the effective fingerprint zone with a first compression method and compresses the fingerprint data in the invalid fingerprint zone with a second compression method. The storage circuit coupling to the multi-compressing circuit stores the compressed fingerprint data. The transmission interface coupling to the storage circuit receives the compressed fingerprint data and transmits the compressed fingerprint data to a host for the recognition of the fingerprint.

Figure 2:
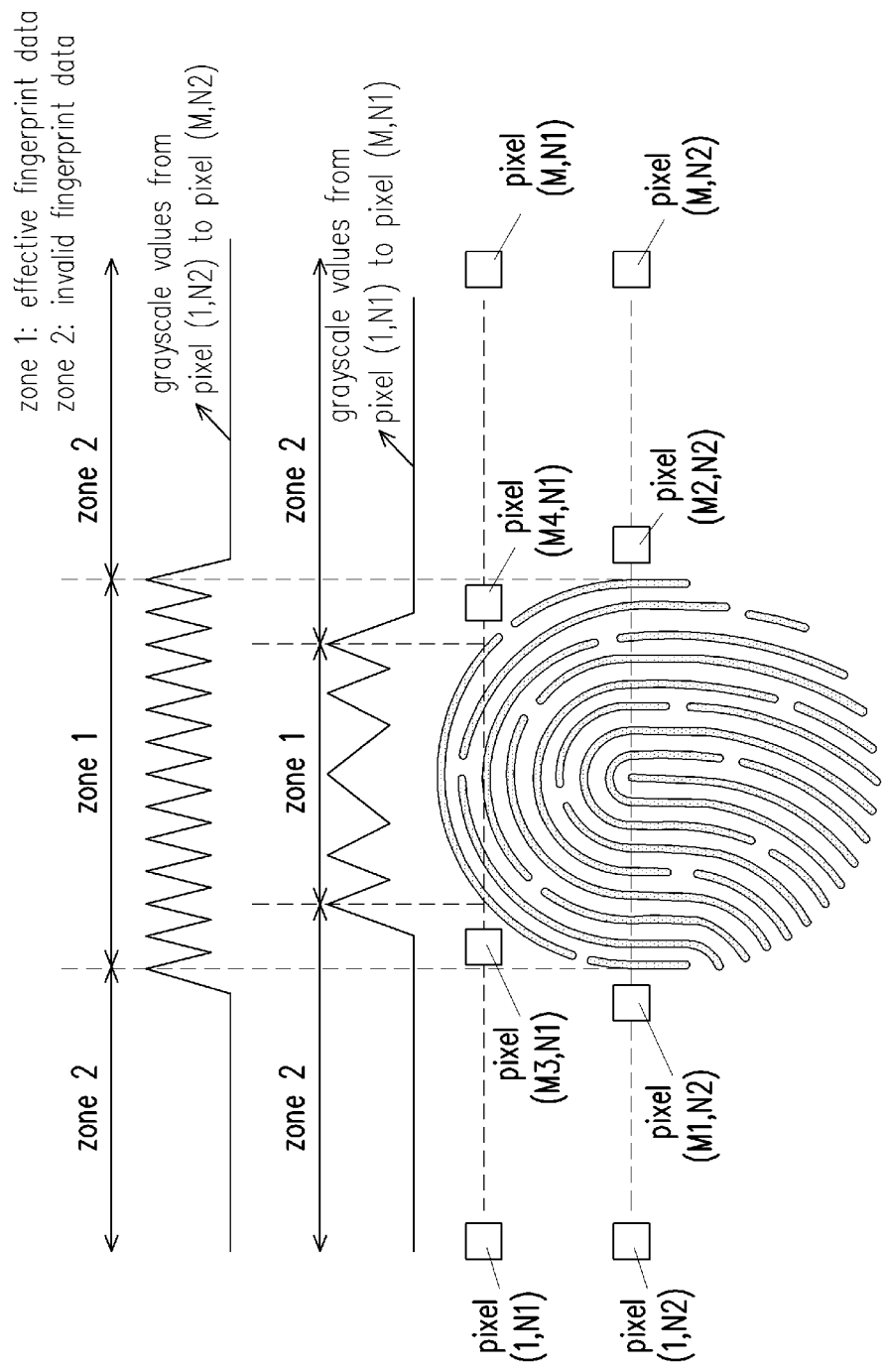
FIG. 2 is a determination of an effective fingerprint zone of a pixel array and an invalid fingerprint zone of the pixel array according to the characteristic values of each row of the pixel array according to an embodiment of the disclosure.

FIG. 2 is a determination of the effective fingerprint zone (zone 1) of the pixel array and the invalid fingerprint zone (zone 2) of the pixel array according to the characteristic values of each row of the pixel array according to an embodiment of the disclosure. The control circuit sequentially turn on the pixel array after exposure of the fingerprint data to obtain the characteristic values of each row of the pixel array. The characteristic values of each row of the pixel array are for example, but not limited to, grayscale values of each row of the pixel array. The characteristic values of each row of the pixel array may include resolution, brightness, spectral distribution, discrepancy, relevancy, color depth, etc. The effective fingerprint distribution judgement circuit determines the first part of the pixel array as the effective fingerprint zone (zone 1) and the second part of the pixel array as the invalid fingerprint zone (zone 2) according to differences of the grayscale values of adjacent pixels of each row of the pixel array.

Take a row of the pixel array (from pixel (1,N2) to pixel (M,N2)) for an example, the effective fingerprint distribution judgement circuit determines pixel (1,N2) to pixel (M1,N2) and pixel (M2,N2) to pixel (M,N2) as the invalid fingerprint zone (zone 2) since differences of the grayscale values of adjacent pixels in pixel (1,N2) to pixel (M1,N2) and pixel (M2,N2) to pixel (M,N2) are substantially zero and less than a threshold value, and determines pixel (M1+1,N2) to pixel (M2−1,N2) as the effective fingerprint zone (zone 1) since differences of the grayscale values of adjacent pixels in pixel (M1+1,N2) to pixel (M2−1,N2) are greater or equal to the threshold value.

Take a row of the pixel array (from pixel (1,N1) to pixel (M,N1)) for another example, the effective fingerprint distribution judgement circuit determines pixel (1,N1) to pixel (M3,N1) and pixel (M4,N1) to pixel (M,N1) as the invalid fingerprint zone (zone 2) since differences of the grayscale values of adjacent pixels in pixel (1,N1) to pixel (M3,N1) and pixel (M4,N1) to pixel (M,N1) are substantially zero and less than the threshold value, and determines pixel (M3+1,N1) to pixel (M4−1,N1) as the effective fingerprint zone (zone 1) since differences of the grayscale values of adjacent pixels in pixel (M3+1,N1) to pixel (M4−1,N1) are greater or equal to the threshold value.

The effective fingerprint distribution judgement circuit determines the first part of the pixel array as the effective fingerprint zone and the second part of the pixel array as the invalid fingerprint zone after determining the effective fingerprint zone and the invalid fingerprint zone in each row of the pixel array.

The multi-compressing circuit coupling to the effective fingerprint distribution judgement circuit compresses the fingerprint data in the effective fingerprint zone (zone 1) with the first compression method and compresses the fingerprint data in the invalid fingerprint zone (zone 2) with the second compression method. In order to reduce the fingerprint data process time for recognizing the fingerprint with high recognition rate, the first compression method for the fingerprint data in the effective fingerprint zone (zone 1) uses a lossless compression to fully keep characteristics of the fingerprint data and the second compression method for the fingerprint data in the invalid fingerprint zone (zone 2) uses a higher compression ratio than the first compression method. The storage circuit coupling to the multi-compressing circuit stores the fingerprint data compressed by the first compression method and the second compression method. The transmission interface coupling to the storage circuit receives the compressed fingerprint data and transmits the compressed fingerprint data to the host for the recognition of the fingerprint.

Figure 3:
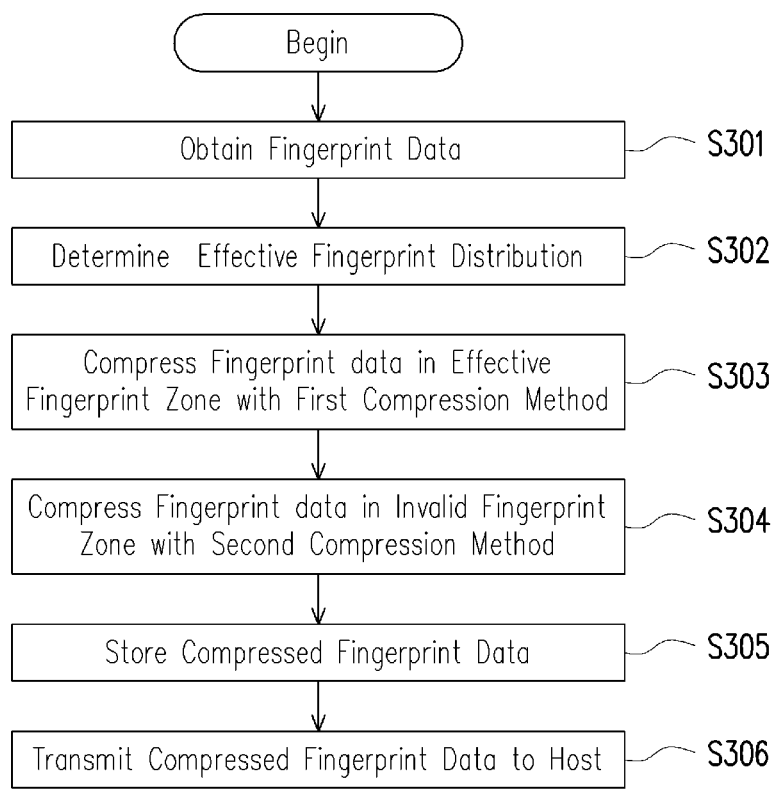
FIG. 3 is a flow chart of compressing the fingerprint data according to fingerprint distribution to save transmission bandwidth according to an embodiment of the disclosure.

FIG. 3 is a flow chart of compressing the fingerprint data according to fingerprint distribution to save transmission bandwidth according to an embodiment of the disclosure. In step S301, the pixel array obtains the fingerprint data. In step S302, the effective fingerprint distribution judgement circuit determines the effective fingerprint distribution. In step S303 and S304, the multi-compressing circuit compresses the fingerprint data in the effective fingerprint zone with the first compression method and compresses the fingerprint data in the invalid fingerprint zone with the second compression method. In step S305, the storage circuit stores the compressed fingerprint data. In step S306, the transmission interface receives the compressed fingerprint data and transmits the compressed fingerprint data to the host for the recognition of the fingerprint.

To sum up, in the fingerprint recognition apparatus provided by the disclosure, the fingerprint data process time for recognizing the fingerprint with high recognition rate is shortened by compressing the fingerprint data in the effective fingerprint zone with the first compression method and compressing the fingerprint data in the invalid fingerprint zone with the second compression method.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A fingerprint recognition apparatus, comprising:
    a pixel array, obtaining a fingerprint data;
    a control circuit, coupling to the pixel array and obtaining characteristic values of the pixel array;
    an effective fingerprint distribution judgement circuit, coupling to the pixel array and determining a first part of the pixel array as an effective fingerprint zone and a second part of the pixel array as an invalid fingerprint zone according to the characteristic values of each row of the pixel array; and
    a multi-compressing circuit, coupling to the effective fingerprint distribution judgement circuit and compressing the fingerprint data in the effective fingerprint zone with a first compression method and compressing the fingerprint data in the invalid fingerprint zone with a second compression method.

2. The fingerprint recognition apparatus as claimed in claim 1, wherein the effective fingerprint distribution judgement circuit determines the first part of the pixel array as the effective fingerprint zone and the second part of the pixel array as the invalid fingerprint zone according to differences of the characteristic values of adjacent pixels of each row of the pixel array.

3. The fingerprint recognition apparatus as claimed in claim 2, wherein the effective fingerprint distribution judgement circuit determines first adjacent pixels of each row of the pixel array as the effective fingerprint zone when differences of the characteristic values of the first adjacent pixels of each row of the pixel array are equal to or greater than a threshold value and determines second adjacent pixels of each row of the pixel array as the invalid fingerprint zone when differences of the characteristic values of the second adjacent pixels of each row of the pixel array are less than the threshold value.

4. The fingerprint recognition apparatus as claimed in claim 1, wherein the characteristic values of the pixel array comprise grayscale values.

5. The fingerprint recognition apparatus as claimed in claim 1, wherein the first compression method comprises a lossless compression.

6. The fingerprint recognition apparatus as claimed in claim 1, wherein the first compression method comprises a first compression ratio, the second compression method comprises a second compression ratio, and the second compression ratio is greater than the first compression ratio.

7. A method adapted to a fingerprint recognition apparatus, comprising:
    obtaining a fingerprint data;
    determining an effective fingerprint zone and an invalid fingerprint zone according to characteristic values of each row of a pixel array of the fingerprint recognition apparatus; and
    compressing the fingerprint data in the effective fingerprint zone with a first compression method and the fingerprint data in the invalid fingerprint zone with a second compression method.

8. The method as claimed in claim 7, wherein determining the effective fingerprint zone and the invalid fingerprint zone is according to differences of the characteristic values of adjacent pixels of each row of the pixel array.

9. The method as claimed in claim 8, wherein determining first adjacent pixels of each row of the pixel array as the effective fingerprint zone when differences of the characteristic values of the first adjacent pixels of each row of the pixel array are equal to or greater than a threshold value and determining second adjacent pixels of each row of the pixel array as the invalid fingerprint zone when differences of the characteristic values of the second adjacent pixels of each row of the pixel array are less than the threshold value.

10. The method as claimed in claim 7, wherein the characteristic values of each row of the pixel array comprise grayscale values.

11. The method as claimed in claim 7, wherein the first compression method comprises a lossless compression.

12. The method as claimed in claim 7, wherein the first compression method comprises a first compression ratio, the second compression method comprises a second compression ratio, and the second compression ratio is greater than the first compression ratio.

* * * * *